(12) United States Patent
Janevik et al.

(10) Patent No.: US 11,585,730 B2
(45) Date of Patent: Feb. 21, 2023

(54) SUPPORT STRUCTURE FOR COLLISION OBJECT AND COLLISION OBJECT COMPRISING SUCH SUPPORT STRUCTURE

(71) Applicant: AstaZero AB, Borås (SE)

(72) Inventors: Peter Janevik, Mölndal (SE); Niklas Lundin, Kungsbacka (SE); Mats Petersson, Gothenburg (SE)

(73) Assignee: AstaZero AB, Borås (SE)

( * ) Notice: Subject to any disclaimer, the term of this patent is extended or adjusted under 35 U.S.C. 154(b) by 347 days.

(21) Appl. No.: 16/624,370

(22) PCT Filed: Jun. 21, 2018

(86) PCT No.: PCT/EP2018/066556
§ 371 (c)(1),
(2) Date: Dec. 19, 2019

(87) PCT Pub. No.: WO2019/002081
PCT Pub. Date: Jan. 3, 2019

(65) Prior Publication Data
US 2020/0217754 A1 Jul. 9, 2020

(30) Foreign Application Priority Data
Jun. 27, 2017 (SE) .................... 1750823-5

(51) Int. Cl.
*G01M 17/007* (2006.01)
*F16F 7/12* (2006.01)

(52) U.S. Cl.
CPC ........... *G01M 17/0078* (2013.01); *F16F 7/12* (2013.01); *F16F 7/122* (2013.01); *F16F 2224/0225* (2013.01)

(58) Field of Classification Search
CPC ........ G01M 17/0078; G01M 7/08; F16F 7/12; F16F 7/122; F16F 2224/0225; G09B 9/048; G09B 9/006; A63H 17/002; G08G 1/16
See application file for complete search history.

(56) References Cited

U.S. PATENT DOCUMENTS

| 8,428,864 B2 | 4/2013 | Kelly et al. | |
| 2013/0017346 A1* | 1/2013 | Kelly | B60T 7/22 428/33 |

FOREIGN PATENT DOCUMENTS

EP   2988369 A1   2/2016

OTHER PUBLICATIONS

ISO/TC211 Systematic Review (Year: 2021).*
(Continued)

*Primary Examiner* — Eric S. McCall
*Assistant Examiner* — Timothy P Graves
(74) *Attorney, Agent, or Firm* — RMCK Law Group, PLC

(57) ABSTRACT

Support structure adapted to form a collision object for use when testing a subject vehicle to simulate a real traffic environment, the support structure comprising a plurality of panels having a bending stiffness according to ISO 5628:2012 of 20 Nm to 60 Nm, such as 30 Nm to 50 Nm, such as 35 Nm to 45 Nm. A support structure adapted to form a collision object for use when testing a subject vehicle to simulate a real traffic environment, the support structure comprising a plurality of panels made from cardboard, is also provided. A collision object for use when testing a subject vehicle to simulate a real traffic environment is also provided.

18 Claims, 7 Drawing Sheets

(56) References Cited

OTHER PUBLICATIONS www.carscoop.com, Papercraft Love: The lightest Honda NSX Super GT Ever, 2010 (Year: 2010).*
Autodesk Slicer for Fusion 360, CAD Studio—Arkance Systems, Assembly instructions in Slicer for Fusion 360—cardboard head, interlocked slices, https://www.youtube.com/watch?v=Gsli17Xialg, Feb. 15, 2017 (Year: 2017).*
Anonymous: "Lightest Honda NSX Super GT is made out of . . . paper," Jan. 22, 2010 (Jan. 22, 2010), pp. 1-4, Retrieved from the Internet Oct. 30, 2018: http://www.auto-power-girl.com/cars-news/2010/01/22/honda/3788/lightest_honda_nsx_super_gt_is_made_ou_of__paper.html.
International Preliminary Report on Patentability for International Application No. PCT/EP2018/066556 dated Oct. 14, 2019 and Applicant's Response, 39 pages.
International Search Report and Written Opinion for International Application No. PCT/EP2018/066556 dated Nov. 15, 2018, 9 pages.
Reimers, W. et al: "Entwicklung eines QualitatsStandards tor Schwerwellpappe unter Berucksichtigung mechanisch/klimatischer Belastungen in internationalen Log i sti kkette n", Oct. 31, 2009 (Oct. 31, 2009), pp. 1-52, Retrieved from the Internet: URL:https://www.bfsv.de/fileadmin/user_upload/03_Forschung/Forschungsbericht_AIF14836_N_Wellpappe2.pdf [retrieved on Nov. 2, 2018].
Communication Pursuant to Article 94(3) EPC dated Mar. 26, 2021 for EP Application No. 18753054.8, 5 pages.
EPO Summons to Attend Oral Proceedings Pursuant to Rule 115(1) EPC dated Aug. 11, 2021 for European Patent Application No. 18753054.8, 8 pages.
Decision To Refuse A European Patent Application dated Apr. 13, 2022 from the European Patent Office for EP Application No. 18753054.8, 9 pages.

* cited by examiner

SUPPORT STRUCTURE FOR COLLISION OBJECT AND COLLISION OBJECT COMPRISING SUCH SUPPORT STRUCTURE

CROSS-REFERENCE TO RELATED APPLICATIONS

This application is a 371 U.S. National Stage of International Application No. PCT/EP2018/066556, filed Jun. 21, 2018, which claims priority to Swedish Patent Application No. 1750823-5, filed Jun. 27, 2017. The disclosures of each of the above applications are incorporated herein by reference in their entirety.

TECHNICAL FIELD

The present disclosure generally relates to deformable collision objects. In particular, a support structure adapted to form a collision object, where the support structure comprises a plurality of panels and a collision object comprising such support structure, are provided.

BACKGROUND

As Advanced Crash Avoidance Technologies (ACATs) such as Forward Collision Warning (FM), Crash Imminent Braking Systems and other advanced technologies continue to be developed, the need for full-scale test methodologies that can minimize hazards to test personnel and damage to equipment has rapidly increased. Evaluating such ACAT systems presents many challenges. For example, the evaluation system should be able to deliver a potential collision object reliably and precisely along a trajectory that would ultimately result in a crash in a variety of configurations, such as rear-ends, head-ons, crossing paths and sideswipes. Additionally, the collision object should not pose a substantial physical risk to the test driver, other test personnel, equipment, or to subject vehicles in the event that the collision is not avoided. This challenge has been difficult to address. The collision object should also appear to the subject vehicle as the actual or "real" object being simulated, such as a motor vehicle, a pedestrian, or other object. For example, the collision object should provide a consistent signature for radar and other sensors to the various subject vehicles, substantially identical to that of the item being simulated.

EP 2988369 A1 discloses a soft car body mounted on a dynamic motion element. The soft car body comprises a plurality of body panels formed from polyethylene foam aiming to reduce the risk of tearing individual panels. After a collision with a subject vehicle, the soft car body is reassembled with the original body panels.

SUMMARY

Some prior art collision objects are heavy. For this reason, a driver of a subject vehicle may be hesitant to collide with the collision object and the testing of the subject vehicle may thus be impaired. The risk for damages, such as scratches, to the subject vehicle is also increased when the weight of the collision object increases.

One solution to this problem is to provide an inflatable balloon-like target having a low weight. However, such targets have an unstable shape and are unsuitable for travelling at high speeds. Moreover, due to the unstable shape of such balloon-like targets, the similarity between the target and the "real" object is often poor. This in turn may lead to a poor simulation of a real traffic environment, e.g. a camera of a subject vehicle may have difficulties in distinguishing characteristic features of the target.

One object of the present disclosure is to provide a support structure for a collision object that enables the collision object to be hit by a subject vehicle at higher speeds with no or reduced damages to the subject vehicle. A higher speed in this regard may be a relative speed between the subject vehicle and the collision object of 180 km/h, e.g. when each of the subject vehicle and the collision object travels at 90 km/h.

A further object of the present disclosure is to provide a support structure for a collision object that is stable and can maintain its shape, e.g. that does not flutter at high speeds. The support structure should thus enable the collision object to resemble the "real" object even when travelling at high speeds and in heavy wind.

A still further object of the present disclosure is to provide a support structure for a collision object that both enables the collision object to be hit by a subject vehicle at high speeds and that is stable at high speeds.

A still further object of the present disclosure is to provide a support structure adapted to form a collision object that has a low weight.

A still further object of the present disclosure is to provide a cheap support structure adapted to form a collision object.

A still further object of the present disclosure is to provide a simple support structure adapted to form a collision object.

A still further object of the present disclosure is to provide a support structure adapted to form a collision object that facilitates the testing of a subject vehicle, e.g. that reduces downtime between two tests.

A still further object of the present disclosure is to provide a collision object comprising a support structure solving one or more of the foregoing objects.

According to one aspect, there is provided a support structure adapted to form a collision object for use when testing a subject vehicle to simulate a real traffic environment, the support structure comprising a plurality of panels having a bending stiffness according to ISO 5628:2012 of 20 Nm to 60 Nm, such as 30 Nm to 50 Nm, such as 35 Nm to 45 Nm. According to one variant, each of all panels of the support structure has a bending stiffness according to ISO 5628:2012 of 20 Nm to 60 Nm, such as 30 Nm to 50 Nm, such as 35 Nm to 45 Nm.

Throughout the present disclosure, a collision object may alternatively be referred to as a dummy object, soft body, soft target, collision target or collision partner. The collision object may be movable or stationary. The cardboard may be suitable for outdoor use, e.g. coated.

The support structure according to the present disclosure is self-supporting, i.e. it is capable of carrying its own weight. The support structure may additionally carry, for example, a cloth of the collision object.

The plurality of panels may be made from cardboard. However, the panels may be made from alternative materials having a bending stiffness according to ISO 5628:2012 of 20 Nm to 60 Nm, such as 30 Nm to 50 Nm, such as 35 Nm to 45 Nm. The bending stiffness of panels made from materials other than paper and board can also be tested by a two-point, three-point or four-point method according to ISO 5628: 2012.

According to one variant, the plurality of panels are made from corrugated cardboard. The corrugated cardboard may comprise one or several fluted sheets glued to one or more flat sheets. The corrugated cardboard may for example be single faced, single walled, double walled or tripled walled.

One type of cardboard suitable for all panels of the support structure is 126 BC by Stora Enso. This type of corrugated cardboard has wet strength in all layers and is glued with waterproof adhesive.

Each of the plurality of panels may have an ECT-value (Edge Crush Test) according to DIN EN ISO 3037 of 10 kN/m to 30 kN/m, such 15 kN/m to 25 kN/m, such as 19 kN/m to 21 kN/m.

Each of the plurality of panels may have a bursting strength according to ISO 2758:2014 of 2000 kPa to 4600 kPa, such as 2500 kPa to 4100 kPa, such as 3000 kPa to 3600 kPa, such as 3200 kPa to 3400 kPa, such as approximately 3300 kPa.

The support structure may be disposable. The support structure according to this variant may be for single use. Thus, once a collision object comprising the support structure has been impacted, the collision object may be replaced. In this manner, the testing of the subject vehicle may become more efficient since time does not have to be spent on rebuilding the collision object. However, the support structure according to the present disclosure may be rebuilt after impact, i.e. the support structure may alternatively be for multiple use.

According to a further aspect, there is provided a support structure adapted to form a collision object for use when testing a subject vehicle to simulate a real traffic environment, the support structure comprising a plurality of panels made from cardboard. According to one variant, all panels are made from cardboard, e.g. from the same type of cardboard.

According to a further aspect, there is provided a collision object for use when testing a subject vehicle to simulate a real traffic environment, the collision object comprising a support structure according to the present disclosure.

The collision object may be configured to deform by deformation of one or more of the plurality of panels of the support structure. Thus, in addition, or as an alternative, to deformation by disengagement between panels, the support structure according to the present disclosure may deform by deformation of individual panels.

The collision object may have a general appearance of a vehicle, such as a car or motorcycle. Alternatively, the collision object may have a general appearance of a starship drone, a truck, a pedestrian, a traffic barrier, a traffic pole, a road sign or an animal.

The plurality of panels of the support structure may comprise at least one longitudinal panel oriented substantially vertically. The at least one longitudinal panel may be referred to as a bulkhead panel. The plurality of panels of the support structure may comprise two longitudinal panels oriented substantially vertically.

The plurality of panels of the support structure may comprise a plurality of lateral panels. Some or all of the lateral panels may be arranged in pairs.

Some of the panels may comprise recesses and the panels may be connected by receiving some of the panels in the recesses. According to one variant, the panels of the support structure are assembled only by means of interlocking hook engagement between pairs of recesses in the panels. For example, a first recess of a first panel may be engaged with a second recess of a second panel such that the first and second recesses establish an interlocking hook engagement. The interlocking hook engagement may comprise mating the bottom of a recess with a panel or with the bottom of another recess of a panel. However, the support structure may comprise alternative or additional fastening structures, such as Velcro® fasteners.

The collision object may further comprise a movable platform for moving the collision object, wherein the support structure is supported on the movable platform. The movable platform may be of various types. One common feature of the various types of movable platform may be that the subject vehicle should be capable of running over the movable platform. A movable platform is however not essential for the collision object to move. The collision object may for example alternatively be moved by ropes or wires. In this case, the collision object may hang from one or more ropes wires. The collision object according to the present disclosure may further comprise a cloth or shell designed to resemble the "real" object in question (e.g. a car, a motorbike, a truck, a pedestrian or an animal).

As used herein, a substantially perpendicular/parallel relationship includes a perfectly perpendicular/parallel relationship as well as deviations from a perfectly perpendicular/parallel relationship with up to 5%, such as up to 2%. Furthermore, a substantially horizontal axis as used herein includes a perfectly horizontal axis as well as deviations from a perfectly horizontal axis with up to 5%, such as up to 2%. Furthermore, a vertical direction as used herein refers to a direction aligned with the direction of the force of gravity and a horizontal direction refers to a direction perpendicular to the vertical direction.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
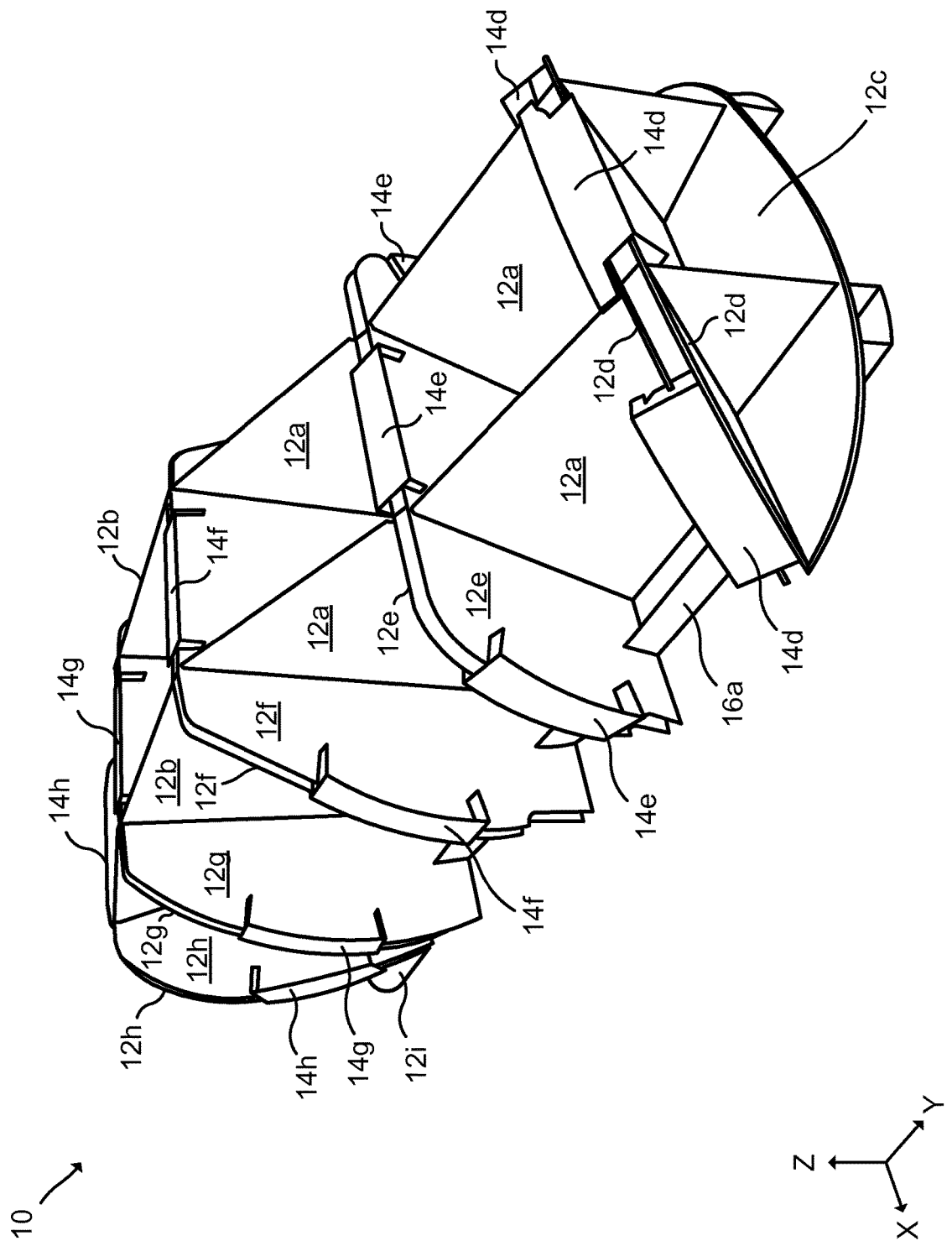
FIG. 1: schematically represents a perspective view of one example of a support structure.

In the following, a support structure adapted to form a collision object, where the support structure comprises a plurality of panels and a collision object comprising such support structure, will be described. The same reference numerals will be used to denote the same or similar structural features.

FIG. 1 schematically represents a perspective view of one example of a support structure 10 in an assembled state. In the example of FIG. 1, the support structure 10 has the general shape and size of a car. However, the support structure 10 may adopt the shapes of various alternative objects for use when testing a subject vehicle, such as a motorbike or other vehicle other than a car, a pedestrian, an animal etc.

FIG. 1 further shows a coordinate system comprising three axes X, Y and Z. In FIG. 1, the X-direction corresponds to a lateral direction of the support structure 10, the Y-direction corresponds to a longitudinal direction of the support structure 10 and the Z-direction corresponds to a vertical direction of the support structure 10.

The support structure 10 in FIG. 1 comprises a plurality of panels 12a-12i. In this example, each of the plurality of panels 12a-12i is made from cardboard. The support structure 10 further comprises a plurality of fixing members 14d-h. In the example of FIG. 1, also the fixing members 14d-h are made of cardboard. The panels 12a-12i and the fixing members 14d-h engage each other by means of recesses (not denoted in FIG. 1).

The support structure 10 in FIG. 1 comprises two front longitudinal panels 12a. The panels 12a are arranged substantially in the vertical Y-Z-plane. The support structure 10 further comprises two rear longitudinal panels 12b. Also the panels 12b are arranged substantially in the vertical Y-Z-plane. The two front longitudinal panels 12a and the two rear longitudinal panels 12b partly overlap along the longitudinal direction Y. Each panel 12a, 12b is folded twice at its bottom. In FIG. 1, a substantially vertical flange 16a of the panel 12a can be seen. As an alternative configuration, each pair of front longitudinal panel 12a and rear longitudinal panel 12b may be replaced by a continuous longitudinal panel extending along substantially the entire length of the support structure 10.

The support structure 10 further comprises a plurality of lateral panels 12c-12i. The panels 12c-12i are lateral since each of them has an extension plane comprising a component parallel with the lateral direction X.

A single front lateral panel 12c is substantially horizontally oriented. Two front lateral panels 12d are arranged in a pair. The two front lateral panels 12d are angled approximately 45° to the vertical direction Z.

The support structure to further comprises three pairs of intermediate lateral panels 12e, 12f, 12g. The two lateral panels 12e are angled approximately 25° to the vertical direction Z. The two lateral panels 12f are angled approximately 5° to the vertical direction Z. The two lateral panels 12g are approximately vertical.

Two rear lateral panels 12h are arranged in a pair. The two rear lateral panels 12h are angled approximately −40° to the vertical direction Z. A single rear lateral panel 12i is approximately horizontal.

Three front fixing members 14d fix the two front lateral panels 12d against relative movement. One front fixing member 14d is arranged on each outer side of the two front longitudinal panels 12a. One front fixing member 14d is arranged between the two front longitudinal panels 12a.

Three intermediate fixing members 14e fix the two intermediate lateral panels 12e against relative movement. One intermediate fixing member 14e is arranged on each outer side of the two front longitudinal panels 12a. One intermediate fixing member 14e is arranged between the two front longitudinal panels 12a.

Three intermediate fixing members 14f (only two are visible in FIG. 1) fix the two intermediate lateral panels 12f against relative movement. One intermediate fixing member 14f is arranged on each outer side of the overlap between the two front longitudinal panels 12a and the two rear longitudinal panels 12b. One intermediate fixing member 14e is arranged between the overlap between the two front longitudinal panels 12a and the two rear longitudinal panels 12b.

Three intermediate fixing members 14g (only two are visible in FIG. 1) fix the two intermediate panels 12g against relative movement. One intermediate fixing member 14g is arranged on each outer side of the two rear longitudinal panels 12b. One intermediate fixing member 14g is arranged between the two rear longitudinal panels 12b.

Three rear fixing members 14h (only two are visible in FIG. 1) fix the two rear lateral panels 12h against relative movement. One rear fixing member 14h is arranged on each outer side of the two rear longitudinal panels 12b. One rear fixing member 14h is arranged between the two rear longitudinal panels 12b.

In the example of FIG. 1, each panel 12a-12i and each fixing member 14d-14h is made from corrugated cardboard. Cardboard may alternatively be referred to as paperboard. The longitudinal panels 12a, 12b are folded at their bottoms and the lateral panels 12c-12i are flat in the assembled state of the support structure 10.

Each cardboard panel 12a-12i of the support structure 10 in FIG. 1 has a bending stiffness according to ISO 5628:2012 of approximately 39 Nm. Bending stiffness may be used when determining stackability of a package comprising cardboard. The bending stiffness can be measured in a four point bending stiffness tester.

Each cardboard panel 12a-12i of the support structure 10 in FIG. 1 further has an ECT-value (Edge Crush Test) according to DIN EN ISO 3037 of approximately 20 kN/m. The ECT-value of the cardboard is typically the most important value when determining stackability of a package comprising cardboard.

Each cardboard panel 12a-12i of the support structure 10 in FIG. 1 further has a bursting strength according to ISO 2758:2014 of approximately 3300 kPa. The bursting strength of the cardboard is indicative of the ability of the cardboard to hold together.

The bending stiffness, the ECT-value and/or the bursting strength may be measured when the panels 12a-12i are flat, i.e. prior to any possible folding.

Since all the components of the support structure 10 in FIG. 1 are disposable, i.e. the panels 12a-12i and the fixing members 14d-14h, also the entire support structure 10 is disposable.

Due to the low number of components and the engagement of the panels 12a-12i by means of recesses, the support structure 10 in FIG. 1 is simple to assemble. It is also simple to replace individual panels 12a-12i of the support structure 10, e.g. due to partial deformation of the support structure 10.

Figure 2A:
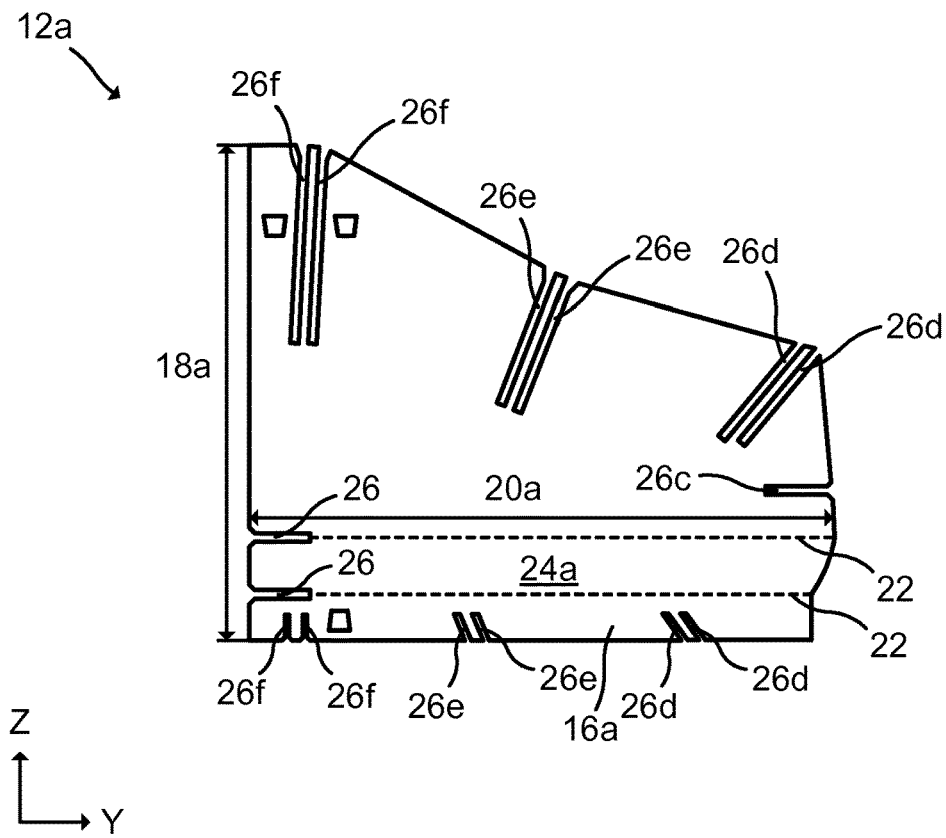
FIG. 2a: schematically represents a plan view of a panel in FIG. 1.

FIG. 2a schematically represents a plan view of one of the two front longitudinal panels 12a in FIG. 1 in a flat state. The panel 12a has a height 18a of 1639 mm and a width 20a of 1940 mm.

The panel 12a comprises two fold lines 22. The panel 12a can be folded 90° along each fold line 22 into the configuration in FIG. 1. When the panel 12a is folded along the fold lines 22, the panel 12a forms a bottom 24a and the flange 16a.

The panel 12a further comprises two elongated recesses 26f extending from an upper side of the panel 12a and two elongated recesses 26f extending from a lower side of the panel 12a. The upper recesses 26f are angled approximately 5° and the lower recesses 26f are angled approximately −5° to the vertical direction Z. When the panel 12a is folded along the fold lines 22, the recesses 26f are configured to mate with recesses of the two intermediate lateral panels 12f.

The panel 12a further comprises two elongated recesses 26e extending from the upper side of the panel 12a and two elongated recesses 26e extending from the lower side of the panel 12a. The upper recesses 26e are angled approximately 25° and the lower recesses 26e are angled approximately −25° to the vertical direction Z. When the panel 12a is folded along the fold lines 22, the recesses 26e are configured to mate with recesses of the two intermediate lateral panels 12e.

The panel 12a further comprises two elongated recesses 26d extending from the corner adjoining the upper side and a front side and two elongated recesses 26d extending from the lower side of the panel 12a. The upper recesses 26d are angled approximately 45° and the lower recesses 26d are angled approximately −45° to the vertical direction Z. When the panel 12a is folded along the fold lines 22, the recesses 26e are configured to mate with recesses of the two front lateral panels 12d.

The panel 12a further comprises one elongated recess 26c extending from the front side. The recess 26c is angled approximately 90° to the vertical direction Z. When the panel 12a is folded along the fold lines 22, the recess 26c is configured to mate with a recess of the front lateral panel 12c.

Figure 2B:
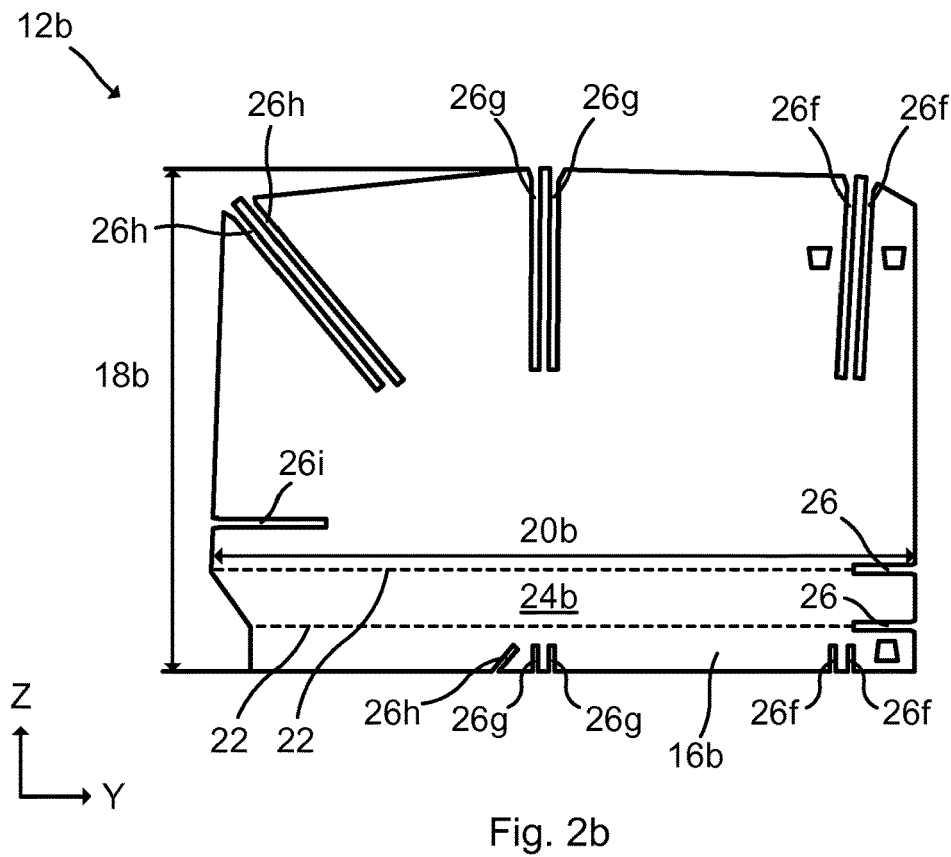
FIG. 2b: schematically represents a plan view of a further panel in FIG. 1.

FIG. 2b schematically represents a plan view of one of the two front longitudinal panels 12b in FIG. 1 in a flat state. The panel 12b has a height 18b of 1668 mm and a width 20b of 2337 mm.

Also the panel 12b comprises two fold lines 22. The panel 12a can be folded 90° along each fold line 22 into the configuration in FIG. 1. When the panel 12b is folded along the fold lines 22, the panel 12b forms a bottom 24b and a flange 16b.

The panel 12b further comprises two elongated recesses 26f extending from an upper side of the panel 12b and two elongated recesses 26f extending from a lower side of the panel 12b. The upper recesses 26f are angled approximately 5° and the lower recesses 26f are angled approximately −5° to the vertical direction Z. When the panel 12b is folded along the fold lines 22, the recesses 26f, together with the recesses 26f of the panel 12a, are configured to mate with recesses of the two intermediate lateral panels 12f. Thus, the recesses 26f of the panel 12a and the recesses 26f of the panel 12b are aligned in the longitudinal direction Y when the support structure 10 adopts the assembled state in FIG. 1.

The panel 12b in FIG. 2b further comprises two elongated recesses 26g extending from the upper side of the panel 12b and two elongated recesses 26g extending from the lower side of the panel 12b. The upper recesses 26g and the lower recesses 26e are approximately vertical. When the panel 12b is folded along the fold lines 22, the recesses 26g are configured to mate with recesses of the two intermediate lateral panels 12g.

The panel 12b further comprises two elongated recesses 26h extending from the corner adjoining the upper side and a rear side and one single elongated recess 26h extending from the lower side of the panel 12b. The upper recesses 26h are angled approximately −40° and the lower recess 26h is angled approximately 40° to the vertical direction Z. When the panel 12b is folded along the fold lines 22, the recesses 26h are configured to mate with recesses of the two rear lateral panels 12h. Both rear lateral panels 12h mate with the single lower recess 26h of the panel 12b in FIG. 2b.

The panel 12a further comprises one elongated recess 26i extending from the rear side. The recess 26i is angled approximately −90° to the vertical direction Z. When the panel 12b is folded along the fold lines 22, the recess 26i is configured to mate with a recess of the rear lateral panel 12i.

Figure 2C:
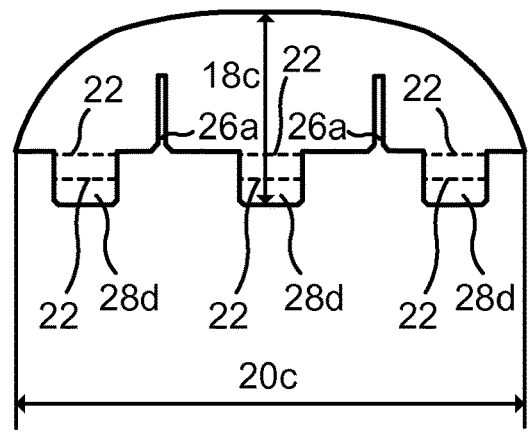
FIG. 2c: schematically represents a plan view of a further panel in FIG. 1.

FIG. 2c schematically represents a plan view of the front lateral panel 12c in FIG. 1. The panel 12c has a height 18c of 604 mm and a width 20c of 1590 mm.

The panel 12c comprises three tabs 28d protruding from a lower side of the panel 12c. The panel 12c further comprises two fold lines 22 for being folded into the configuration in FIG. 1. In the folded state of the panel 12c, the tabs 28d may be configured to engage with recesses of the two front panels 12d.

The panel 12C further comprises two recesses 26a extending from the lower side of the panel 12c. Each of the two recesses 26a of the panel 12c is configured to be engaged with a recess 26c of one of the front longitudinal panels 12a.

Figure 2D:
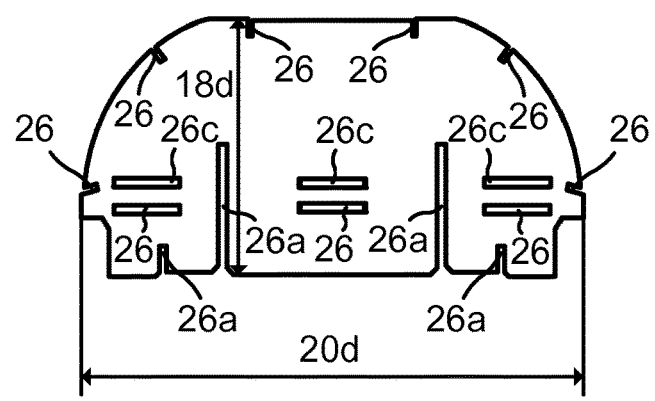
FIG. 2d: schematically represents a plan view of a further panel in FIG. 1.

FIG. 2d schematically represents a plan view of one of the two front lateral panels 12d in FIG. 1. The panel 12d has a height 18d of 800 and a width 20d of 1564 mm.

The panel 12d comprises two recesses 26 at its upper side and two recesses 26 at each of its right and left side. These recesses 26 are configured to engage with recesses of the fixing members 14d.

The panel 12d further comprises two longer recesses 26a and two shorter recesses 26a extending from a lower side of the panel 12d. Each of the two longer recesses 26a is configured to be engaged with an upper recess 26d of a panel 12a according to FIG. 2a when the panel 12a is folded. Each of the two shorter recesses 26a is configured to be engaged with a lower recess 26d of a panel 12a according to FIG. 2a. The engagement may be referred to as a hook engagement.

The panel 12d further comprises six horizontal slots or recesses 26, 26c. The recesses 26c may receive the tabs 28d of the panel 12c.

Figure 2E:
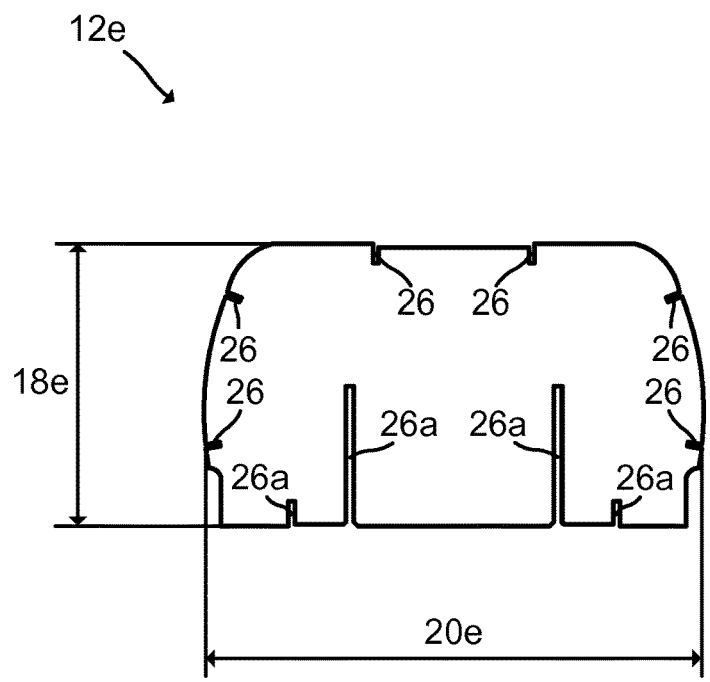
FIG. 2e: schematically represents a plan view of a further panel in FIG. 1.

FIG. 2e schematically represents a plan view of one of the two intermediate lateral panels 12e in FIG. 1. Mainly differences with respect to FIG. 2d will be described. The panel 12e has a height 18e of 915 mm and a width 20e of 1613 mm.

The panel 12e comprises two longer recesses 26a and two shorter recesses 26a extending from a lower side of the panel 12e. Each of the two longer recesses 26a is configured to be engaged with an upper recess 26e of a panel 12a according to FIG. 2a when the panel 12a is folded. Each of the two shorter recesses 26a is configured to be engaged with a lower recess 26e of a panel 12a according to FIG. 2a when the panel 12a is folded.

Figure 2F:
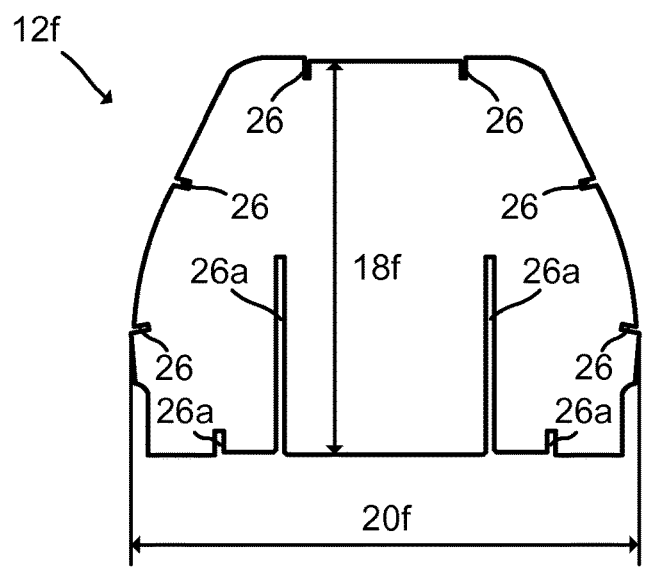
FIG. 2f: schematically represents a plan view of a further panel in FIG. 1.

FIG. 2f schematically represents a plan view of one of the two intermediate lateral panels 12f in FIG. 1. Mainly differences with respect to FIGS. 2d and 2e will be described. The panel 12f has a height 18f of 1290 mm and a width 20f of 1650 mm.

The panel 12f comprises two longer recesses 26a and two shorter recesses 26a extending from a lower side of the panel 12f. Each of the two longer recesses 26a is configured to be engaged with an upper recess 26f of a panel 12a according to FIG. 2a when the panel 12a is folded. Additionally, each of the two longer recesses 26a is configured to be engaged with an upper recess 26f of a panel 12b according to FIG. 2b when the panel 12b is folded. Each of the two shorter recesses 26a is configured to be engaged with a lower recess 26f of a panel 12a according to FIG. 2a when the panel 12a is folded. Additionally, each of the two shorter recesses 26a is configured to be engaged with a lower recess 26f of a panel 12b according to FIG. 2b when the panel 12b is folded.

Figure 2G:
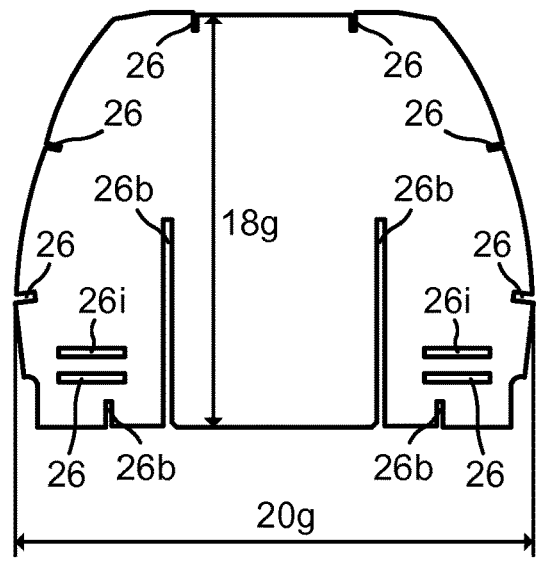
FIG. 2g: schematically represents a plan view of a further panel in FIG. 1.

FIG. 2g schematically represents a plan view of one of the two intermediate lateral panels 12g in FIG. 1. Mainly differences with respect to FIGS. 2d to 2f will be described. The panel 12g has a height 18g of 1326 mm and a width 20g of 1649 mm.

The panel 12g comprises two longer recesses 26b and two shorter recesses 26b extending from a lower side of the panel 12g. Each of the two longer recesses 26b is configured to be engaged with an upper recess 26g of a panel 12b according to FIG. 2b when the panel 12b is folded. Each of the two shorter recesses 26b is configured to be engaged with a lower recess 26g of a panel 12b according to FIG. 2b when the panel 12b is folded.

The panel 12g further comprises four horizontal slots or recesses 26, 26i. The recesses 26i may receive tabs of the panel 12i.

Figure 2H:
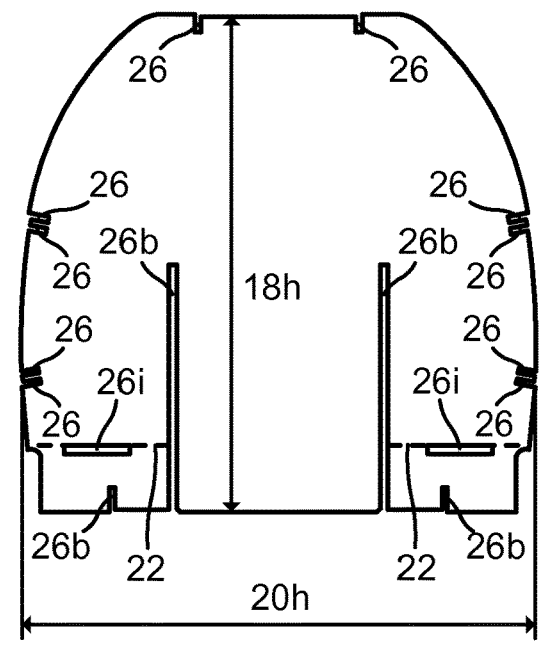
FIG. 2h: schematically represents a plan view of a further panel in FIG. 1.

FIG. 2h schematically represents a plan view of one of the two rear lateral panels 12h in FIG. 1. Mainly differences with respect to FIGS. 2d to 2g will be described. The panel 12h has a height 18h of 1586 mm and a width 20h of 1635 mm.

The panel 12h comprises two longer recesses 26b and two shorter recesses 26b extending from a lower side of the panel 12h. Each of the two longer recesses 26b is configured to be engaged with an upper recess 26h of a panel 12b according to FIG. 2b when the panel 12b is folded. Each of the two shorter recesses 26b is configured to be engaged with a lower recess 26h of a panel 12b according to FIG. 2b when the panel 12b is folded.

The panel 12h further comprises two horizontal slots or recesses 26i. The recesses 26i may receive tabs of the panel 12i.

Figure 2I:
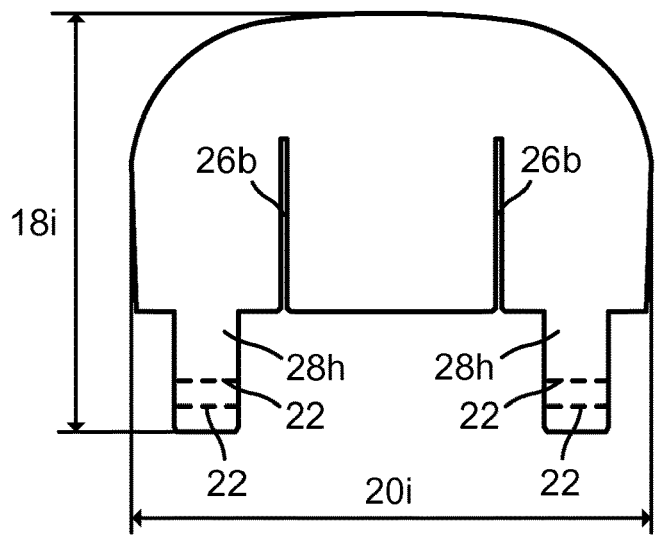
FIG. 2i: schematically represents a plan view of a further panel in FIG. 1.

FIG. 2i schematically represents a plan view of the rear lateral panel 12i in FIG. 1. The panel 12i has a height 18i of 1313 mm and a width 20i of 1630 mm.

The panel 12i comprises two tabs 28h protruding from a lower side of the panel 12i. The panel 12i further comprises two fold lines 22 for being folded into the configuration in FIG. 1. In the folded state of the panel 12i, the tabs 28h may be configured to engage with the recesses 26i of the panel 12h and the recesses 26i of the panel 12g.

The panel 12i further comprises two recesses 26b extending from the lower side of the panel 12i. Each of the two recesses 26b of the panel 12i is configured to be engaged with a recess 26i of one of the rear longitudinal panels 12b.

Figure 2J:
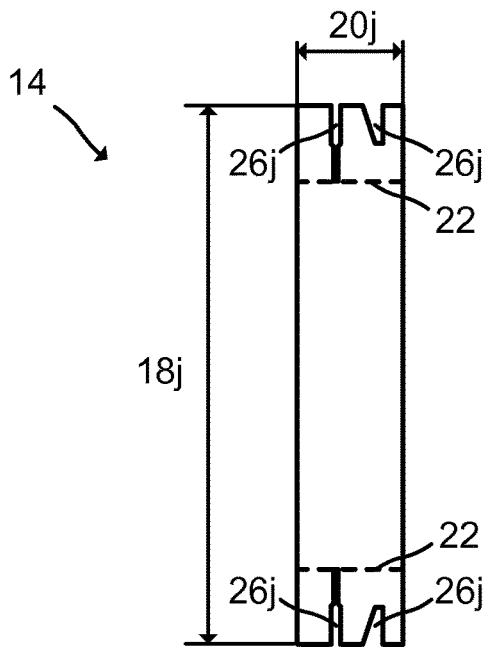
FIG. 2j: schematically represents a plan view of a fixing member in FIG. 1.

FIG. 2j schematically represents a plan view of one fixing member 14 of the fixing members 14d-14e in FIG. 1. The fixing member 14 is flat in its unfolded state in FIG. 2j. The fixing member 14 has a height 18j of 710 mm and a width 20j of 140 mm.

The fixing member 14 comprises two fold lines 22. The fixing member 14 may be folded approximately 90° at each fold line 22 to adopt a state according to FIG. 1. The fixing member 14 further comprises four recesses 26j for mating with a recess 26 of any of the panels 12c-12h.

As can be gathered from FIGS. 1 and 2a to 2i, the support structure 10 is simple to manufacture since each panel 12a-12i and each fixing member 14d-14h can be cut out from a flat sheet of cardboard. The panels 12a-12i may be scored or marked as necessary to facilitate folding of the panels 12a-12i to be folded. All recesses in FIGS. 2a to 2i may be collectively referred to with reference numeral 26.

Figure 3:
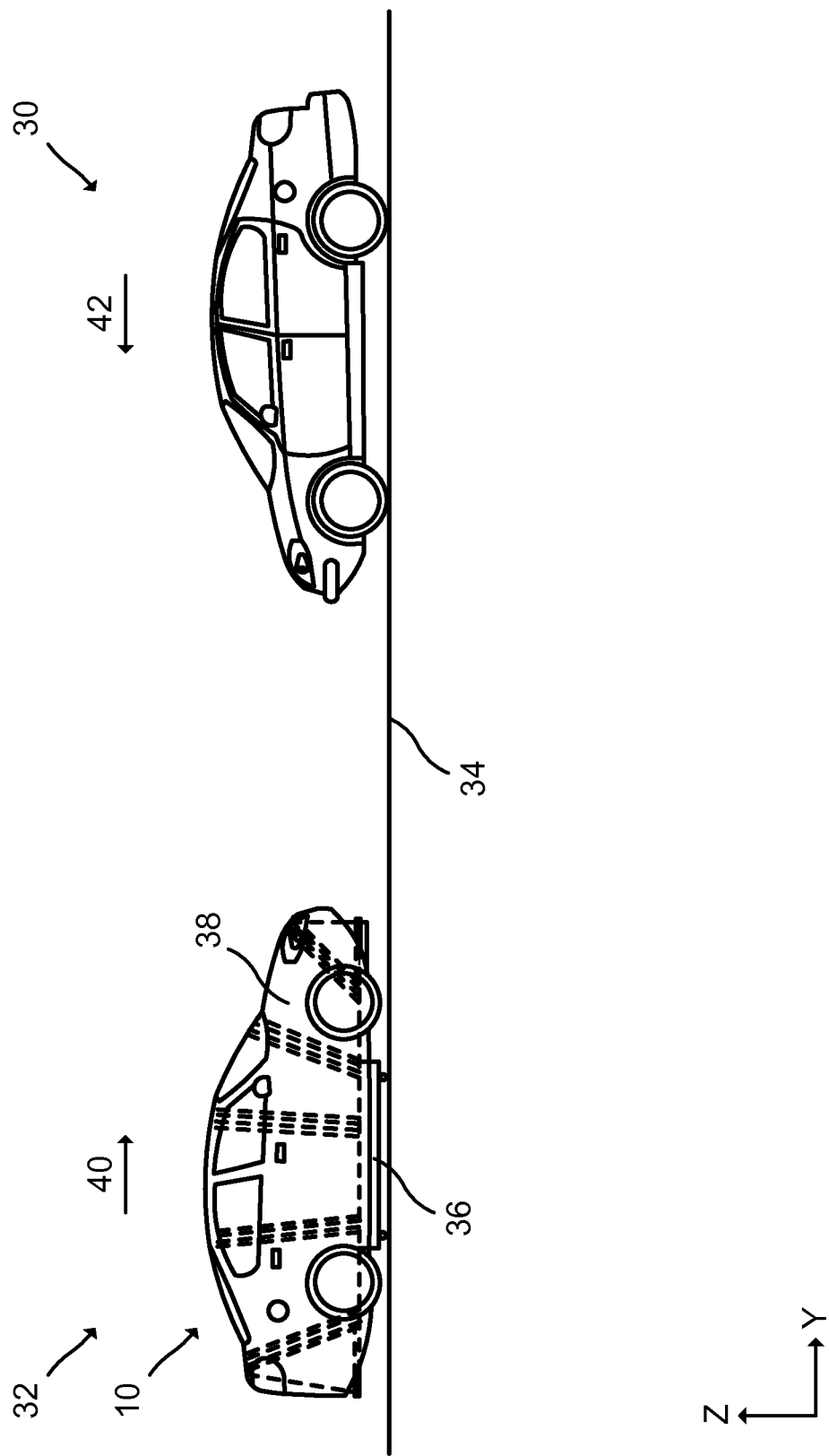
FIG. 3: schematically represents a side view of a subject vehicle and a collision object comprising the support structure in FIG. 1.

FIG. 3 schematically represents a side view of a subject vehicle 30 and a collision object 32 comprising the support structure 10 in FIG. 1 on a test track 34. The collision object 32 of the example in FIG. 3 further comprises a movable platform 36 and a cloth 38. The cloth 38 comprises printing of characteristic features, e.g. headlights, to resemble a "real" vehicle. Which features that are characteristic may depend on the functionality of the subject vehicle 30. The cloth 38 may be fastened to the support structure 10 by means of suitable fasteners, such as Velcro® fasteners or hook/loop fasteners. Arrow 40 indicates a forward travel direction of the collision object 32 and arrow 42 indicates a forward travel direction of the subject vehicle 30.

The collision object 32 in FIG. 3 can travel stably at high speeds, i.e. without losing its general appearance. The applicant has performed tests with the collision object 32 according to FIG. 3. The collision object 32 deformed as intended, i.e. without damaging the subject vehicle 30, when the collision object 32 was stationary and the subject vehicle 30 had a speed of 110 km/h.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A support structure adapted to form a collision object for use when testing a subject vehicle to simulate a real traffic environment, the support structure comprising a plurality of lateral and longitudinal flat panels having bending stiffness according to ISO 5628:2012 of 20 Nm to 60 Nm, and at least one fixing member not a flat panel, wherein some or all of the lateral panels are arranged in pairs, wherein the panels of the support structure are assembled only by interlocking hook engagement between pairs of recesses in the lateral and longitudinal panels and engaging the at least one fixing member to inhibit relative movement between.

2. The support structure according to claim 1, wherein the plurality of panels are made from cardboard.

3. The support structure according to claim 2, wherein the plurality of panels are made from corrugated cardboard.

4. The support structure according to claim 1, wherein each of the plurality of panels has an ECT-value according to DIN EN ISO 3037 of 10 kN/m to 30 kN/m.

5. The support structure according to claim 1, wherein each of the plurality of panels has a bursting strength according to ISO 2758:2014 of 2000 kPa to 4600 kPa.

6. The support structure according to claim 1, wherein the support structure is disposable.

7. A collision object for use when testing a subject vehicle to simulate a real traffic environment, the collision object comprising a support structure according to claim 1.

8. The collision object according to claim 7, wherein the collision object is configured to deform by deformation of one or more of the plurality of panels of the support structure.

9. The collision object according to claim 7, wherein the collision object has a general appearance of a vehicle or a car.

10. The collision object according to claim 9, wherein the plurality of panels of the support structure comprise at least one longitudinal panel oriented substantially vertically.

11. The collision object according to claim 9, wherein the plurality of panels of the support structure comprise two longitudinal panels oriented substantially vertically.

12. The collision object according to any of claim 7, further comprising a movable platform for moving the collision object, wherein the support structure is supported on the movable platform.

13. The support structure according to claim 1, wherein the plurality of panels have a bending stiffness according to ISO 5628:2012 of 30 Nm to 50 Nm.

14. The support structure according to claim 1, wherein the plurality of panels have a bending stiffness according to ISO 5628:2012 of 35 Nm to 45 Nm.

15. The support structure according to claim 1, wherein each of the plurality of panels has an ECT-value according to DIN EN ISO 3037 of 15 kN/m to 25 kN/m.

16. The support structure according to claim 1, wherein each of the plurality of panels has a bursting strength according to ISO 2758:2014 of 2500 kPa to 4100 kPa.

17. The support structure according to claim 1, wherein each of the plurality of panels has a bursting strength according to ISO 2758:2014 of 3000 kPa to 3600 kPa.

18. A support structure adapted to form a collision object for use when testing a subject vehicle to simulate a real traffic environment, the support structure comprising a plurality of lateral and longitudinal flat panels made from cardboard, and at least one fixing member not a flat panel, wherein some or all of the lateral panels are arranged in pairs, wherein the panels of the support structure are assembled only by interlocking hook engagement between pairs of recesses in the lateral and longitudinal panels and engaging the at least one fixing member to inhibit relative movement between.

* * * * *